United States Patent [19]

Flemming

[11] Patent Number: 5,240,306
[45] Date of Patent: Aug. 31, 1993

[54] AERODYNAMIC DRAG REDUCTION FAIRING

[76] Inventor: George M. Flemming, 221 Marlton Crescent, Winnipeg, Manitoba, Canada, R3R 1A5

[21] Appl. No.: 924,903

[22] Filed: Aug. 5, 1992

[51] Int. Cl.$^5$ .............................................. B62D 35/00
[52] U.S. Cl. .................................................. 296/180.4
[58] Field of Search ............... 296/180.4, 180.5, 180.1, 296/180.2

[56] References Cited

U.S. PATENT DOCUMENTS

| | | | |
|---|---|---|---|
| 4,113,299 | 9/1978 | Johnson et al. | 296/180.4 |
| 4,601,508 | 7/1986 | Kerian | 296/180.4 |
| 4,682,808 | 7/1987 | Bélanin | 296/180.4 |
| 4,978,162 | 12/1990 | Cabbé | 296/180.2 |

OTHER PUBLICATIONS

SAE The Engineering Resource for Avance Mobility The Effect of Front Edge Rounding and Rear-Edge Shaping on the Aerodynamic Dag of Bluff Vehicles in Ground Proximity, Feb. 25, 1985, Kevin R. Cooper.

Primary Examiner—Robert R. Song
Attorney, Agent, or Firm—Adrian D. Battison; Stanley G. Ade; Murray E. Thrift

[57] ABSTRACT

An aerodynamic drag reduction fairing is mounted on a substantially vertical rear surface of a vehicle. The fairing body comprises a generally inverted U-shaped member with a transverse top portion and a pair of depending legs upon the top and sides respectively of the rear surface. The body has a surface which is contiguous with the outside surface of the vehicle at the top and sides and then converges in a curve shape inwardly and rearwardly to a trailing edge spaced rearwardly of the rear surface. The spacing of the trailing edge from the rear surface is greater at the top than at the bottom of the sides legs. From the trailing edge the body extends back to the rear surface to form a hollow interior inside the top portion and the legs. This can be inflated so that the body can be formed from a flexible fabric.

20 Claims, 5 Drawing Sheets

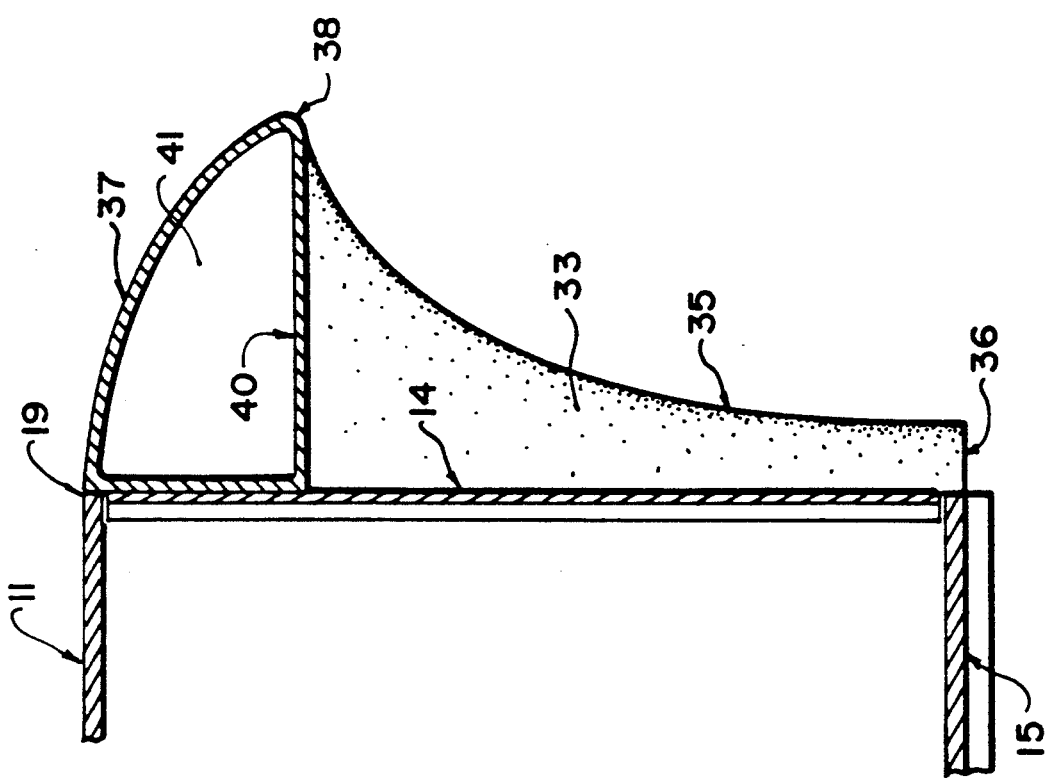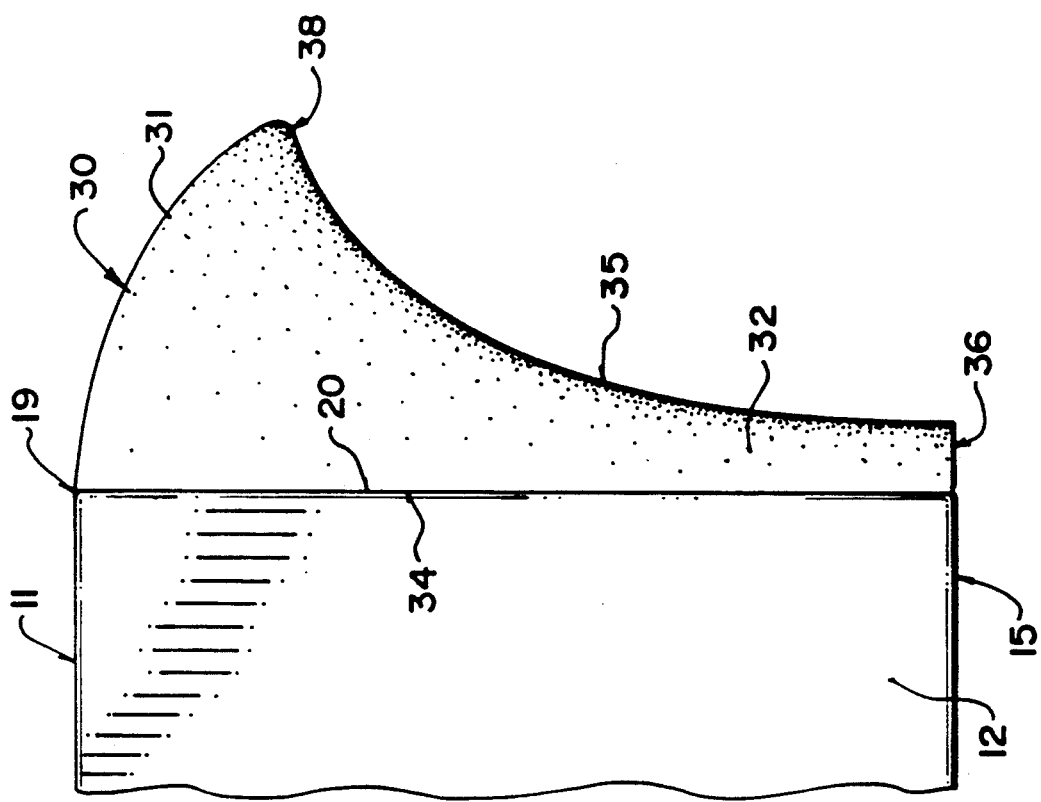

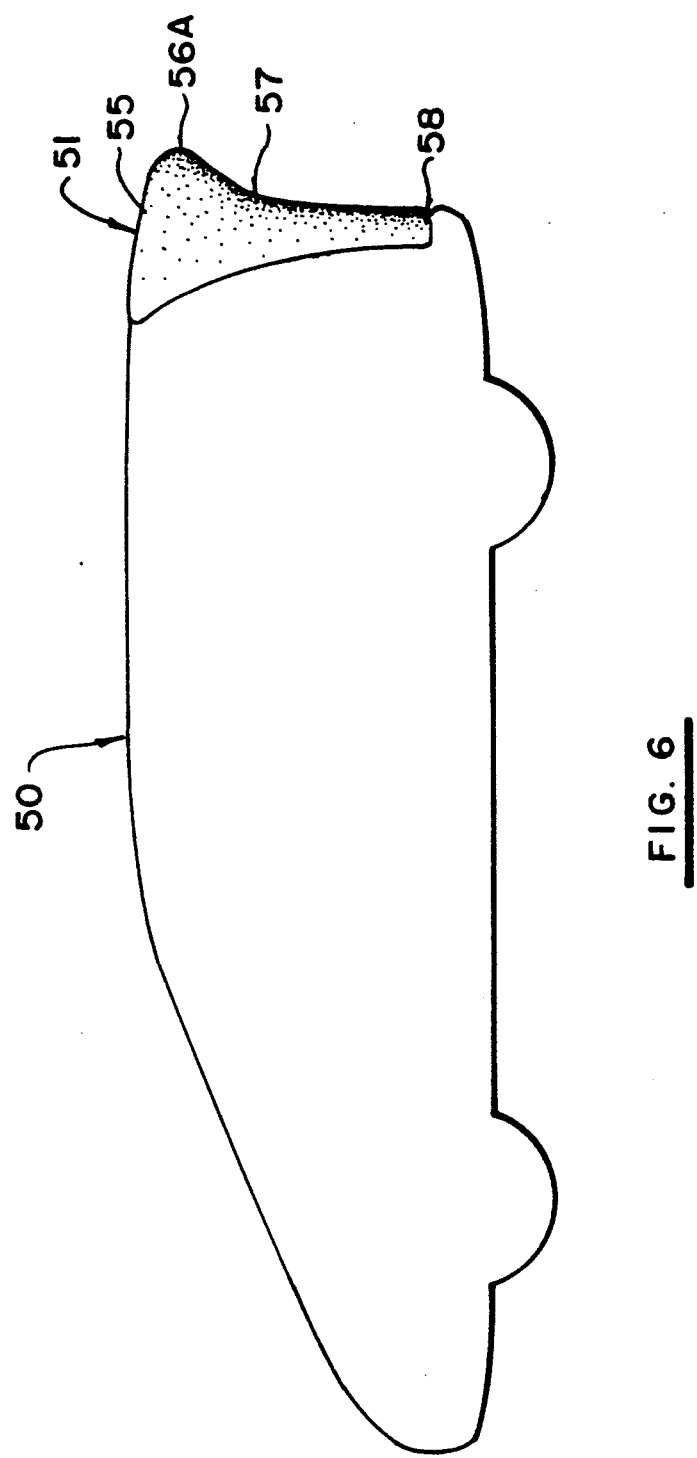

AERODYNAMIC DRAG REDUCTION FAIRING

BACKGROUND OF THE INVENTION

An aerodynamic drag reduction fairing for a generally vertical rear surface of a vehicle.

This invention relates to an aerodynamic drag reduction fairing for mounting on a rear generally vertical surface of a vehicle.

Much attention has been given to providing aerodynamic shaping of vehicles for reduction of drag. Many vehicles such as cargo trailers, campers and the like having simply at the rear end a vertical generally rectangular surface with little or no attempt to improve the drag characteristics at the rear end of the vehicle.

Much attention has been given to improving air flow characteristics at the front of the vehicle by shaping and the provision of protruding bulbous elements. The rear of the vehicle has however received little attention since the advantage to be obtained is undoubtedly less than that by shaping the front of the vehicle and in many cases the rear of the vehicle includes doors which must be accessed and therefore cannot be impeded by the addition of fairing elements.

One attempt to improve the aerodynamic drag of vehicles of this type is described in a paper presented by Kevin R. Cooper of National Aeronautical Establishment Ottawa Canada to the International Congress and Exposition Detroit Michigan Feb. 25 to Mar. 1, 1985 and entitled "THE EFFECT OF FRONT EDGE ROUNDING AND REAR EDGE SHAPING ON THE AERODYNAMIC DRAG OF BLUFF VEHICLES IN GROUND PROXIMITY".

This paper discloses in FIG. 10 the addition of panels to the rear of the vehicle. Various shapes are provided including simple plain surfaces which attach to the top and side edges of the rear of the vehicle an incline rearwardly and inwardly therefrom. This basic arrangement is modified in one example by the provision of a full tail so that the inwardly inclined surfaces taper to a vertical trailing edge at an apex spaced rearwardly from the rear surface of the vehicle. In another modification, the plain surfaces are curved.

None of the proposals achieved significant drag reductions and the paper provides no recommendation utilizing any arrangements of these types. In practice it is believed that this proposal has simply been dismissed in view of the low levels of improvement achieved and in view of the difficulties of implementing the system at the rear of the vehicle.

Other systems which are utilized at the rear of the vehicle include spoilers which are shaped to lift air at the rear of the vehicle so as to force the rear of the vehicle downwardly to improve ground friction. Other devices are used to cause air flow passing over the top surface of the vehicle to turn downwardly behind the rear surface to reduce contamination of a rear window of the vehicle. These devices do not however operate to reduce drag and are not intended for this purpose.

SUMMARY OF THE INVENTION

It is one object of the present invention, therefore, to provide an improved aerodynamic drag reduction fairing for mounting on a rear surface of a vehicle.

According to the invention, therefore, there is provided an aerodynamic drag reduction fairing for mounting on a ground vehicle having a top vehicle surface, two side vehicle surfaces and a generally vertical rear vehicle surface, the rear vehicle surface having a top edge at the top vehicle surface, two side edges at the side vehicle surfaces and a bottom edge, the fairing comprising a fairing body having a forward portion for engaging and mounting on the vehicle at the rear vehicle surface and a rear portion projecting rearwardly from the rear vehicle surface, the forward portion defining a top edge and two side edges of the body each lying contiguously and in contact with the top edge and side edges respectively of the rear vehicle surface of the vehicle so as to cause air flowing along each of the top and side vehicle surfaces to pass over the top edge and side edges respectively of the body onto an outer surface of the rear portion of the body, the rear portion being generally of an inverted U-shape in rear elevation defining a top transverse portion and a pair of side depending legs each extending to a position adjacent the bottom edge and a trailing edge of generally inverted U-shape in rear elevation, an upper surface of said top transverse portion curving from said top edge rearwardly and downwardly to said trailing edge and an outer surface of each of said side legs curving from a respective one of the side edges rearwardly and inwardly to said trailing edge, the body being open underneath the top transverse portion and between the side legs to allow air flowing around the body from the top and side vehicle surfaces to impact the rear surface of the vehicle, the side legs being tapered such that each has a dimension from the side edge to the trailing edge thereof which decreases from the top transverse portion toward the bottom edge of the rear surface.

Preferably the top transverse portion is shaped such that in plan view it is curved so that a dimension thereof from the top edge to the trailing edge is greatest at a midpoint across the vehicle and reduces to each side.

Preferably the body includes an under surface extending from the trailing edge to the rear surface of the vehicle, the under surface being spaced from said upper surfaces and said outer surfaces so as to define a hollow interior of the body there between.

DETAILED DRAWINGS

Embodiments of the invention will now be described in conjunction with the accompanying drawings in which:

FIG. 2 is a side elevational view of the trailer and fairing of FIG. 1.

FIG. 3 is a vertical cross sectional view along a centre line of the fairing and trailer of FIG. 1.

FIG. 6 is a side elevational view showing the silhouette of an aerodynamically styled passenger vehicle showing the aerodynamic drag reduction fairing according to the present invention attached thereto.

DETAILED DESCRIPTION

Figure 1:
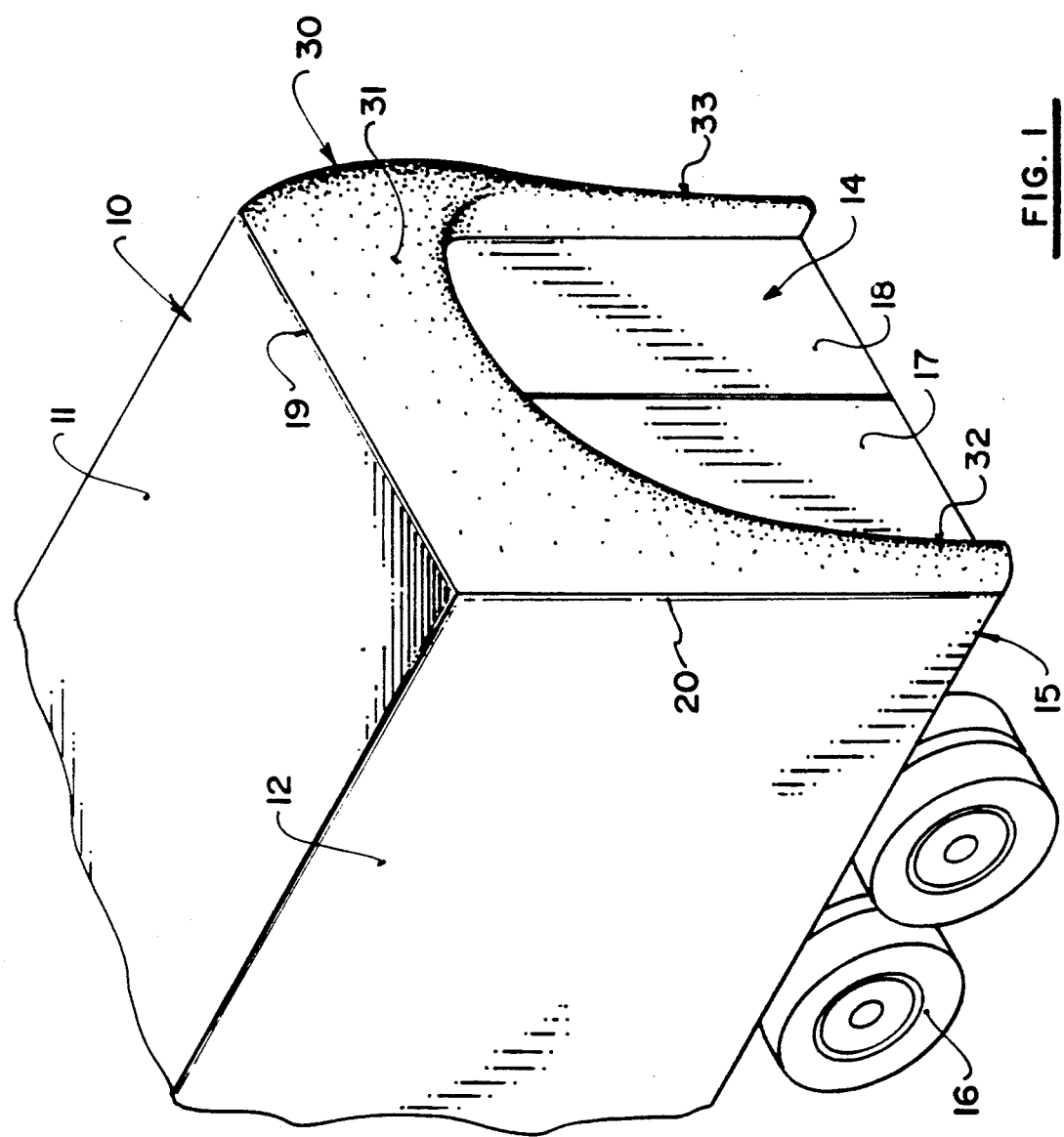
FIG. 1 is an isometric view of a rear part of a trailer showing the aerodynamic drag reduction fairing of the present invention attached thereto.

A conventional trailer is shown in FIGS. 1 through 5 and indicated at 10 with a top surface 11, two side surfaces 12 and 13 and a vertical rear surface 14. The underside 15 of the trailer is mounted on ground wheels 16 in conventional manner. At the rear part of the trailer is provided a pair of doors 17 and 18 which are hinged at the sides of the trailer so as to open at a centre line of the trailer allowing access to the hollow interior of the trailer. All of the above items are of course fully conventional.

The vertical rear surface of the vehicle includes a top edge 19 which is horizontal and of course coincides with the rear of the top surface 11. The rear surface further includes side edges 20 and 21 which again coincide with the rear of the side walls 12 and 13. The rear surface 14 further includes a bottom edge 22 positioned at a height above the ground.

The fairing is attached to the rear surface 14 and is indicated generally at 30. The fairing comprises a fairing body which is generally of an inverted U-shape defining a top transverse portion 31 and a pair of depending legs 32 and 33. The fairing is shaped so that a front edge or front surface of the fairing is attached to the rear surface 14 with a forward most edge 34 of the fairing being coincident with the edges 19, 20 and 21 of the rear surface thus defining a top edge of the fairing and two side front edges of the fairing. The technique for attachment of the fairing to the vehicle is not shown in detail as this will be apparent to one skilled in the art but can employ rivet type fasteners, screws, adhesive or other techniques as required and depending upon the material from which the fairing body is formed. However the fairing is attached in a manner which allows the front edge of the fairing to be contiguous with the respective surface of the vehicle. There are no openings at this junction so that the air flowing along the respective surface of the vehicle is caused to pass over the outside surface of the fairing body in a smooth flow.

Figure 4:
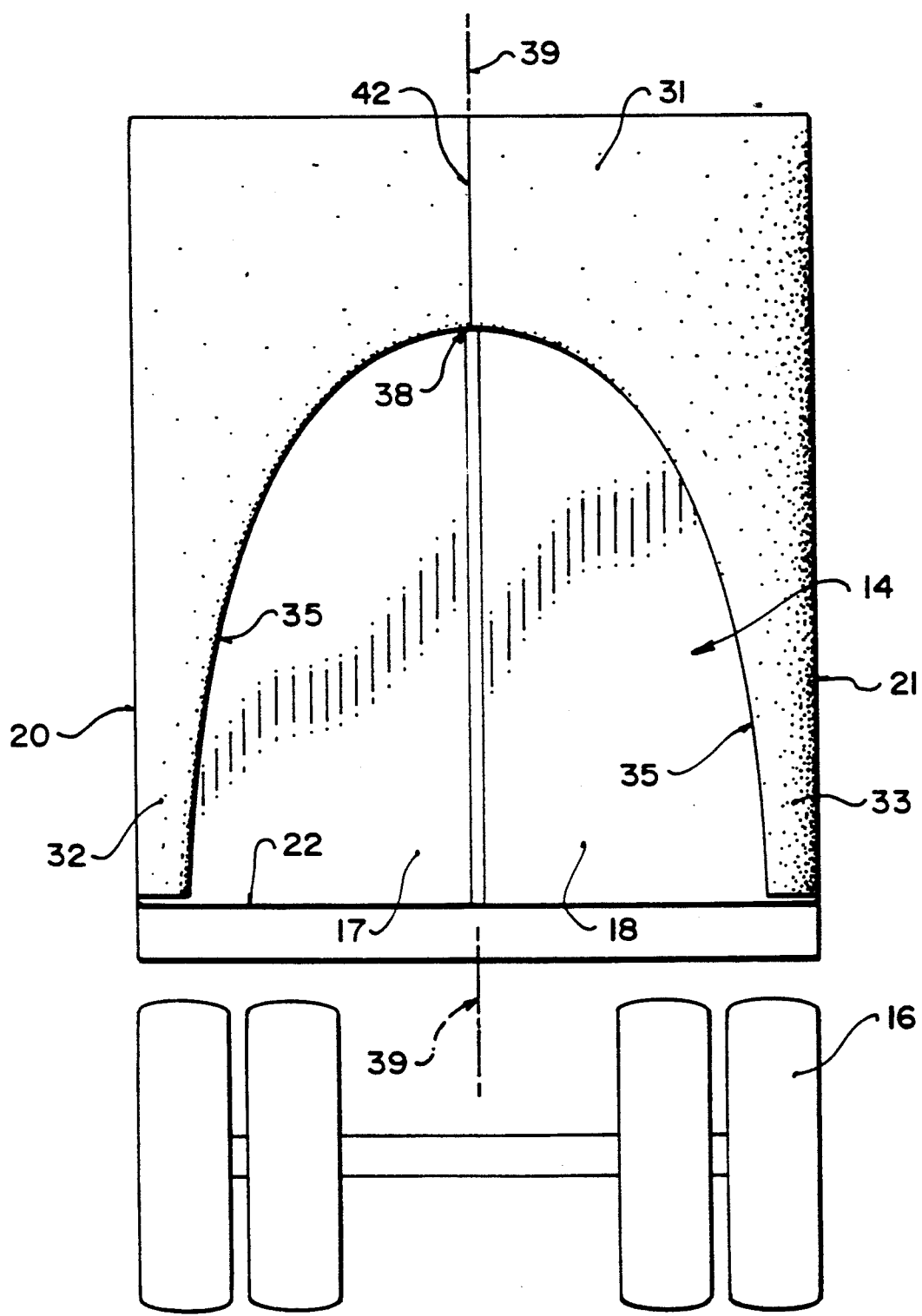
FIG. 4 is a rear elevational view of the trailer of FIG. 1.
Figure 5:
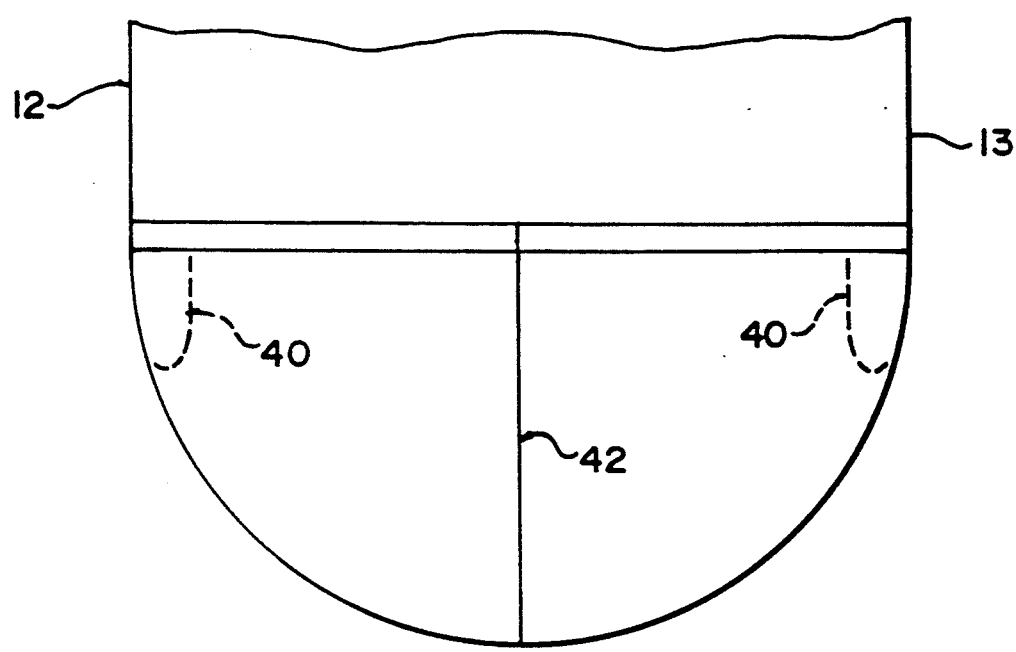
FIG. 5 is a top plan view of the trailer and fairing of FIG. 1.

The fairing body further includes a trailing edge 35 which as best shown in FIG. 4 is arch shaped leaving a majority area of the rear surface 14 exposed underneath the top transverse portion and between the legs 32 and 33.

In addition as best shown in FIGS. 2 and 3, the trailing edge 35 is shaped so that each of the legs 33 and 32 tapers from an upper end thereof downwardly to a horizontal lowermost edge 36 thereof at the bottom edge 22 of the rear surface 14. The taper is shaped to form a concave curvature of the legs 32 and 33. Thus as shown in FIGS. 2 and 3 the legs taper in a direction downwardly and towards the rear surface 14. In addition the legs of course taper in view of the arch shape downwardly and toward the side edges 20 and 21 as best shown in FIG. 4.

The fairing body defines an outer surface which thus commences at the rectangular shape of the rear surface 14 and smoothly converges to the arch shaped trailing edge 35 in a manner which provides a surface which is as smooth as possible to maintain air flow in contact therewith. In particular the outer surface 37 of the top transverse portion is shaped on the arc of a circle so as to extend smoothly rearwardly and downwardly from the top edge 19 to an apex 38 of the trailing edge 35 with that apex lying on a centre line 39 of the vehicle body. The height of the apex is thus below the top edge 19 and above a mid height of the rear surface 14 and preferably is spaced by a distance from the edge 19 which is of the order of ¼ of the height of the rear surface 14. In a preferred formation of the fairing body, the curvature of the upper surface 37 is formed as the arc of a circle having a diameter substantially equal to the width of the rear surface 14 with the centre of the circle positioned at a distance ½ of the width from the top edge 19.

Each of the side legs 32 and 33 has an outer surface which is curved and also extends rearwardly and inwardly toward the centre line. The legs extend to a position at or closely adjacent the bottom edge.

The trailing edge 35 is curved so that its radius of curvature gradually increases from the relatively long curvature around the outside surface to curve inwardly back toward the rear surface 14. This tends therefore to cause the air flow over the outer surface to turn around the trailing edge and to enter the open area underneath the top transverse portion and between the legs to impact upon the rear surface 14.

From the trailing edge, the body includes a wall 40 which extends from the trailing edge directly back to the rear surface 14 along a line at right angles to the surface 14. This forms a hollow interior 41 both in the transverse stop portion and also in the legs.

The body can be formed from a rigid plastics material, from a fiberglass reinforced resin material or from a flexible fabric. Other materials are also possible including formed metal sheet. In a preferred arrangement for use with a trailer of the type shown including rear doors 17 and 18, the body is formed from a flexible fabric which can, when not inflated, simply hang flat against the door. The body for this purpose is formed in two portions divided along a line 42. Thus the arch shaped or U-shaped body is formed into two parts divided by end walls at the centre line so that each part can be separately inflated so as to stand out from the respective door rearwardly from the door. When collapsed, however, the fairing body simply hangs down across the door and can be opened with the door without significant interfering with the opening of the door to a fully opened position lying along the respective side of the vehicle body.

The inflation of the fairing body can be effected by scoops which draw air from the movement of the vehicle into the interior 41 so as to provide a higher pressure on the interior thus holding the fairing body at a substantially body projecting outwardly from the rear of the vehicle.

Figure 7:
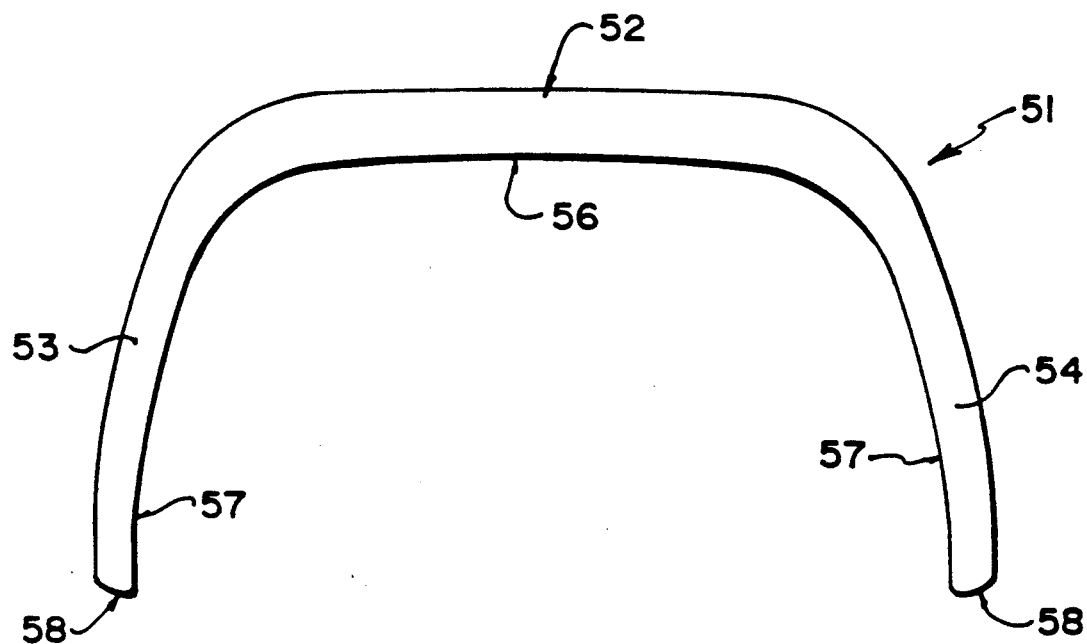
FIG. 7 is a rear elevational view on an enlarged scale of the fairing of FIG. 6.

Turning now to FIGS. 6 and 7, an alternative arrangement is shown designed specifically for an aerodynamically designed passenger vehicle indicated at 50. In this case the fairing body is indicated generally at 51 and is of the same general shape that is an inverted U-shape with a transverse top portion 52 and a pair of depending legs 53 and 54. In this case the body is formed as a substantially solid body without the corresponding hollow interior so that the arch shape of the trailing edge 54 follows much more closely the shape of the rear of the vehicle which in this case has curved top corners rather than the rectangular rear face of the rear of the trailer. However the body includes an outer curved surface 55 curving outwardly and downwardly to an apex 56 similar to the features described in relation to the first embodiment. Also the legs includes a concavely curved trailing edge portion 57 so they again taper downwardly to a lower edge 58 adjacent the bottom of the vehicle.

It is has been found by experimentation both with full scale devices and models using a wind tunnel that the drag is significantly reduced by the arrangement described above. The operation of the device is not fully understood but it is believed that the shape cooperates with the ground effect to cause a high pressure in the air impinging upon the rear surface 14 and moderation of the flow off the vehicle with a total resultant of drag reduction.

In an alternative arrangement (not shown) the inner surfaces 40 are omitted and the construction is formed of a single layer of fabric defining the upper surface of the top transverse portion and the outer surfaces of the legs. The construction remains formed of a flexible fabric material which is inflated by the air flow generated by the surface itself, which, as stated previously, causes the air to move smoothly around the vehicle and to impinge upon the rear surface thus pushing up underneath the flexible fabric and inflating it to the required shape. The forward edge of the flexible fabric is thus attached to the vehicle in the contiguous manner. The rearward edge is formed with a reinforcing element such as a rope, chain or cable which holds the U-shaped rear edge at the required position.

For arrangements which do not include hinged doors of the type previously described, a removable construction can be provided. This is particularly useful with the role-up type doors which can be used in some truck constructions. The device comprises a pair of side posts which can be readily attached to supporting elements along the side edges of the rear face of the truck. Across the top is provided a flexible cord or chain which holds the top edge of the fabric structure across the top edge of the rear face of the vehicle. The rear or trailing edge of the fabric structure can also include a similar cord or chain to reinforce that area. The device can therefore simply be removed by lifting one post from its fixed position along the side of the rear face of the vehicle and this can then be moved around to the opposing side of the vehicle and hooked into place so that the device hangs along the side of the vehicle thus exposing the door. If not required both posts can be removed and the device can be rolled into a cylindrical package for storage in a suitable location on the vehicle.

While the above description has been mainly concerned with the provision of a separate element which can be attached to an existing vehicle such as a truck, it is of course possible that the shape as described above be incorporated into the construction of a new design of passenger vehicle with the construction of the shape at the rear of the vehicle forming a part of the body panels of the vehicle and being associated with the rear lights and the like if required.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An aerodynamic drag reduction fairing for mounting on a ground vehicle having a top vehicle surface, two side vehicle surfaces and a generally vertical rear vehicle surface, the rear vehicle surface having a top edge at the top vehicle surface, two side edges at the side vehicle surfaces and a bottom edge, the fairing comprising a fairing body having a forward portion for engaging and mounting on the vehicle at the rear vehicle surface and a rear portion projecting rearwardly from the rear vehicle surface, the forward portion defining a top edge and two side edges of the body each lying contiguously and in contact with the top edge and side edges respectively of the rear vehicle surface of the vehicle so as to cause air flowing along each of the top and side vehicle surfaces to pass over the top edge and side edges respectively of the body onto an outer surface of the rear portion of the body, the rear portion being generally of an inverted U-shape in rear elevation defining a top transverse portion and a pair of side depending legs each extending to a position adjacent the bottom edge and a trailing edge of generally inverted U-shape in rear elevation, an upper surface of said top transverse portion curving from said top edge rearwardly and downwardly to said trailing edge and an outer surface of each of said side legs curving from a respective one of the side edges rearwardly and inwardly to said trailing edge, the body being open underneath the top transverse portion and between the side legs and being arranged such that some air flowing around the body from the top and side vehicle surfaces impacts the rear surface of the vehicle, the side legs being tapered such that each has a dimension from the side edge to the trailing edge thereof which decreases from the top transverse portion toward the bottom edge of the rear surface.

2. The fairing according to claim 1 wherein the body is curved so that at the trailing edge the body curves back toward the rear surface.

3. The fairing according to claim 1 wherein the top transverse portion is shaped such that in plan view it is curved so that a dimension thereof from the top edge to the trailing edge is greatest at a midpoint across the vehicle and reduces to each side.

4. The fairing according to claim 1 wherein the side legs are shaped in side elevation such that the trailing edge thereof is concave.

5. The fairing according to claim 3 wherein the top transverse portion is shaped such that in plan view the trailing edge thereof defines substantially a semi-circle having a radius equal to one half of the width of the vehicle.

6. The fairing according to claim 5 wherein the trailing edge of the top transverse portion at the mid point thereof is arranged at a height of the order of $\frac{1}{4}$ the height of the rear surface from the top edge.

7. The fairing according to claim 5 wherein the top transverse portion in side elevation has the outer surface thereof curved so as to follow substantially an arc of a circle.

8. The fairing according to claim 5 wherein the side legs are shaped in side elevation such that the trailing edge thereof is concave.

9. The fairing according to claim 1 wherein the body includes an under surface extending from the trailing edge to the rear surface of the vehicle, the under surface being spaced from said upper surface and said outer surfaces so as to define a hollow interior of the body there between.

10. The fairing according to claim 9 wherein the body is formed from a flexible fabric material and wherein there is provided means for inflating the hollow interior.

11. The fairing according to claim 10 wherein the body is formed from two parts divided along a vertical central plane of the body such that each of the parts of the body can be mounted on a separate vertical door panel of the rear surface of the vehicle.

12. An aerodynamic drag reduction for mounting on a ground vehicle having a top vehicle surface two side vehicle surfaces and a generally vertical rear vehicle surface, two side vehicle surfaces and a generally vertical rear vehicle surface, the rear vehicle surface having a top edge at the top vehicle surface, two side edges at the side vehicle surfaces and a bottom edge, the fairing comprising a fairing body having a forward portion for engaging and mounting on the vehicle at the rear vehicle surface and a rear portion projecting rearwardly from the rear vehicle surface, the forward portion defining a top edge and two side edges of the body each lying contiguously and in contact with the top edge and side edges respectively of the rear vehicle surface of the vehicle so as to cause air flowing along each of the top and side vehicle surfaces to pass over the top edge and side edges respectively of the body onto an outer surface of the rear portion of the body, the rear portion being generally of an inverted U-shape in rear elevation defining a top transverse portion and a pair of side depending legs each extending to a position adjacent the bottom edge and a trailing edge of generally inverted U-shape in rear elevation, an upper surface of said top transverse portion curving from said top edge rearwardly and downwardly to said trailing edge and an outer surface of each of said side legs curving from a respective one of the side edges rearwardly and inwardly to said trailing edge, the body being open underneath the top transverse portion and between the side legs and arranged such that some air flowing around the body from the top and side vehicle surfaces impacts the rear surface of the vehicle, the top transverse portion is shaped such that in plan view it is curved so that a dimension thereof from the top edge to the trailing edge is greatest at midpoint across the vehicle an reduces to each side.

13. The fairing according to claim 12 wherein the side legs are shaped in side elevation such that the trailing edge thereof is concave.

14. The fairing according to claim 12 wherein the top transverse portion is shaped such that in plan view the trailing edge thereof defines substantially a semi-circle having a radius equal to one half of the width of the vehicle.

15. The fairing according to claim 14 wherein the trailing edge of the top transverse portion at the mid point thereof is arranged at a height of the order of ¼ the height of the rear surface from the top edge.

16. The fairing according to claim 14 wherein the top transverse portion in side elevation has the outer surface thereof curved so as to follow substantially an arc of a circle.

17. The fairing according to claim 14 wherein the side legs are shaped in side elevation such that the trailing edge thereof is concave.

18. The fairing according to claim 12 wherein the body includes an under surface extending from the trailing edge to the rear surface of the vehicle, the under surface being spaced from said upper surface and said outer surfaces so as to define a hollow interior of the body there between.

19. An aerodynamic drag reduction for mounting on a ground vehicle having a top vehicle surface, two side vehicle surfaces and a generally vertical rear vehicle surface, two side vehicle surfaces and a generally vertical rear vehicle surface, the rear vehicle surface having a top edge at the top vehicle surface, two side edges at the side vehicle surfaces and a bottom edge, the fairing comprising a fairing body having a forward portion for engaging and mounting on the vehicle at the rear vehicle surface and a rear portion projecting rearwardly from the rear vehicle surface, the forward portion defining a top edge and two side edges of the body each lying contiguously and in contact with the top edge and side edges respectively of the rear vehicle surface of the vehicle so as to cause air flowing along each of the top and side vehicle surfaces to pass over the top edge and side edges respectively of the body onto an outer surface of the rear portion of the body, the rear portion being generally of an inverted U-shape in rear elevation defining a top transverse portion and a pair of side depending legs each extending to a position adjacent the bottom edge and a trailing edge of generally inverted U-shape in rear elevation, an upper surface of said top transverse portion curving from said top edge rearwardly and downwardly to said trailing edge and an outer surface of each of said side legs curving from a respective one of the side edges rearwardly and inwardly to said trailing edge, the body being open underneath the top transverse portion and between the side legs and arranged such that some air flowing around the body from the top and side vehicle surfaces impacts the rear surface of the vehicle, the top transverse portion is shaped such that in plan view it is curved so that a dimension thereof from the top edge to the trailing edge is greatest at midpoint across the vehicle an reduces to each side.

20. The fairing according to claim 19 wherein the body is formed from a flexible fabric material and wherein there is provided means for inflating the hollow interior.

* * * * *